United States Patent
Thomas

(10) Patent No.: US 10,703,523 B2
(45) Date of Patent: Jul. 7, 2020

(54) SCREW CONVEYOR CONTAINER FILLING SYSTEM

(71) Applicant: REAGENT CHEMICAL & RESEARCH, INC., Ringoes, NJ (US)

(72) Inventor: Adam Thomas, Oronogo, MO (US)

(73) Assignee: Reagent Chemical & Research, Inc., Ringoes, NJ (US)

( * ) Notice: Subject to any disclaimer, the term of this patent is extended or adjusted under 35 U.S.C. 154(b) by 165 days.

(21) Appl. No.: 15/966,435

(22) Filed: Apr. 30, 2018

(65) Prior Publication Data

US 2019/0329921 A1    Oct. 31, 2019

(51) Int. Cl.
| | |
|---|---|
| *B65B 43/54* | (2006.01) |
| *B65B 39/00* | (2006.01) |
| *B65B 3/32* | (2006.01) |
| *B67C 3/02* | (2006.01) |
| *B65G 47/248* | (2006.01) |
| *B65G 33/04* | (2006.01) |

(52) U.S. Cl.
CPC ............... *B65B 43/54* (2013.01); *B65B 3/32* (2013.01); *B65B 39/004* (2013.01); *B65G 33/04* (2013.01); *B65G 47/248* (2013.01); *B67C 3/02* (2013.01); *B65B 2039/009* (2013.01); *B65G 2201/0244* (2013.01)

(58) Field of Classification Search
CPC ........ B65G 47/248; B65G 33/04; B67C 3/02; B65B 39/004; B65B 3/32; B65B 43/54; B65B 2039/009; B67B 7/28
USPC .......................... 198/838, 389–390, 402, 417
See application file for complete search history.

(56) References Cited

U.S. PATENT DOCUMENTS

| | | | | | |
|---|---|---|---|---|---|
| 2,461,277 | A | * | 2/1949 | Hohl | B65G 33/04 198/402 |
| 2,604,200 | A | * | 7/1952 | Hohl | B65G 33/04 198/402 |
| 3,153,471 | A | * | 10/1964 | Arnett | B65G 47/256 198/383 |
| 3,785,473 | A | * | 1/1974 | Cook | B65G 47/248 198/402 |
| 4,479,574 | A | * | 10/1984 | Julius | B65G 15/50 134/125 |
| 4,974,755 | A | | 12/1990 | Sonntag | |
| 5,609,237 | A | * | 3/1997 | Lenhart | B65G 47/248 198/406 |
| 5,765,675 | A | * | 6/1998 | Draghetti | B65G 33/04 131/94 |
| 5,957,264 | A | * | 9/1999 | Carey | B08B 5/02 198/402 |

(Continued)

*Primary Examiner* — Mark A Deuble
(74) *Attorney, Agent, or Firm* — Dilworth & Barrese, LLP

(57) ABSTRACT

An improved container transportation and filling system and method is provided. The system can deliver cartridges and other containers, such as tubes, in a horizontal orientation. The containers can have a closed bottom end and an open top end. A screw conveyor(s) is used to engage the containers and urge them forward and into rotation around the axis of the screw conveyor, from horizontal to vertical. A guide engages an end of the containers. The guide acts as a camming surface and guides the end of the container downward as it is advanced by the screw conveyor, to orient the container vertically for filling, capping and sealing. A second mirror image downstream screw conveyor and guide can reorient the container from vertical to horizontal.

22 Claims, 7 Drawing Sheets

(56) References Cited

U.S. PATENT DOCUMENTS 6,733,224 B1    5/2004   Linner
8,794,275 B2    8/2014   Gruber \* cited by examiner

SCREW CONVEYOR CONTAINER FILLING SYSTEM

BACKGROUND OF THE INVENTION

The invention relates generally to machines and methods for filling containers, such as rigid and various types of tubes, such as caulking cartridges, with material to be dispensed from those containers. More particularly, the invention relates to an improved system and method for orienting the containers before, during, and/or after they are filled.

A variety of automated processing systems and methods have been employed to deliver storage tubes, bottles and other containers of circular, square or other cross-sectional geometries to a filling station; fill and cap those containers; and then deliver the containers from the filling station. It is typically preferable to dispense material into and fill a container from the bottom up. Therefore, it is typically preferable to fill elongated containers when they are in a vertical orientation. However, the center of gravity of these containers makes them prone to tipping or otherwise makes it inconvenient to transport these containers in the "top-open" upright orientation. Furthermore, cylindrical and cylindrical-like containers are often easily transported by rolling or sliding. Consequently, it is often preferable to transport containers in a horizontal orientation, reorient the containers into a vertical orientation for filling, capping and sealing, and then reorient the containers back to the horizontal orientation for further transportation.

Examples of systems for transporting and filling containers are disclosed in U.S. Pat. Nos. 4,974,755, 6,733,224 and 8,794,275, the contents of each are incorporated herein by reference. These and other systems have not proved to be fully satisfactory in connection with the way the containers are oriented between the vertical and horizontal orientations. This can often lead to inefficient or expensive equipment and/or a slow down the assembly line process.

Accordingly, it is desirable to provide an improved system and method for orienting containers as part of an automated filling process, which overcomes drawbacks of conventional systems and methods.

SUMMARY OF THE INVENTION

Generally speaking, in accordance with the invention, an improved container transportation and filling system and method is provided. The system can deliver containers, such as tubes and tube-shaped cartridges, in a horizontal orientation, wherein the top and bottom ends are pointing sideways. A screw or auger-shaped conveyor, having a helix around a shaft, optionally defined by a spiral ridge having valleys or troughs between the apex of the ridges is provided. This screw conveyor (single, stacked dual screw conveyor or stacked multi-screw conveyor) is used to engage the containers and urge them in the downstream flow direction and into rotation around the axis of the screw conveyor, as the conveyors pivot from a horizontal to a vertical orientation.

A first guide bar rests across the sides of the containers and holds the containers against the screw conveyor. The guide bar permit the containers to slide under the bar and rotate downward from a horizontal to a vertical orientation. A second guide bar or guide rail engages the bottom end of the containers. The guide rail is inclined downward with respect to the axis of the screw conveyor and acts as a camming surface. The guide rail guides the bottom end of the containers downward and downstream as the containers are advanced by the screw conveyor. If the tube includes a nozzle extending from the bottom end of the container, the optional nozzle can help keep the containers in place. A second screw conveyor system can advance the containers through a filling, capping and sealing station. A third downstream screw conveyor can reorient the capped and filled containers from a vertical to a horizontal orientation.

The helix of the screw conveyor can have ridges, with valleys or troughs therebetween, that are the approximate width of the containers. Other configurations can be used, such as a flat helix spiral around a cylindrical shaft or a tight spiral, with close fitting screw threads.

The cross-sectional height of the single screw conveyor or combined height of a multiple stacked screw conveyor should be about 66% to 133%, preferably about 90% to about 110% of the length of the containers. An infeed section preferably includes two screw conveyors, one over the other, to orient the containers from horizontal to vertical. A second screw conveyor section, preferably two screw conveyors, one over the other, can be used to transport the vertical containers through a filling station. An outfeed screw conveyor section, which can be a mirror image of the infeed section, can be used to orient the vertical containers from vertical to horizontal.

Accordingly, it is an object of the invention to provide an improved system and method for filling containers and for transporting containers to, through, and/or from the filling operation.

Still other objects of the invention will in part be obvious and will, in part be apparent from the specification and drawings. The invention accordingly comprises the apparatus and method of operation which will be exemplified in the structures and methods hereinafter described, and the scope of the invention will be indicating the claims.

BRIEF DESCRIPTION OF THE DRAWINGS

For a fuller understanding of the invention, reference is had to the following description, taken in connection with the accompanying drawings, which are not necessarily to scale, in which.

As used herein, like reference numerals will be used to indicate similar elements. The features depicted in the drawings are not necessarily drawn to scale. The drawings are for purposes of illustration only and should not be interpreted as limiting.

DETAILED DESCRIPTION OF THE PREFERRED EMBODIMENTS

Figure 1:
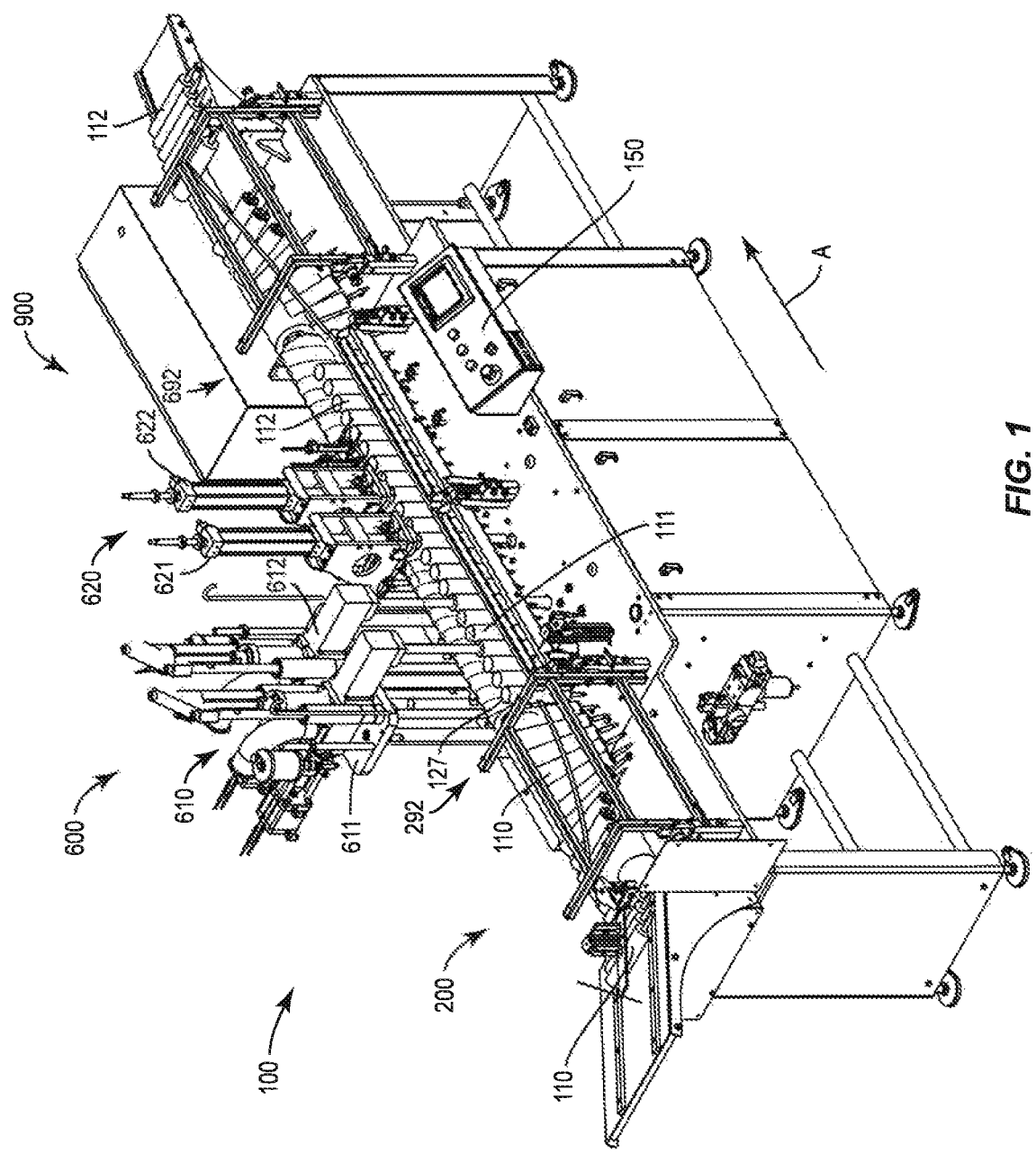
FIG. 1 is a perspective view of a filling apparatus in accordance with a preferred embodiment of the invention.
Figure 2:
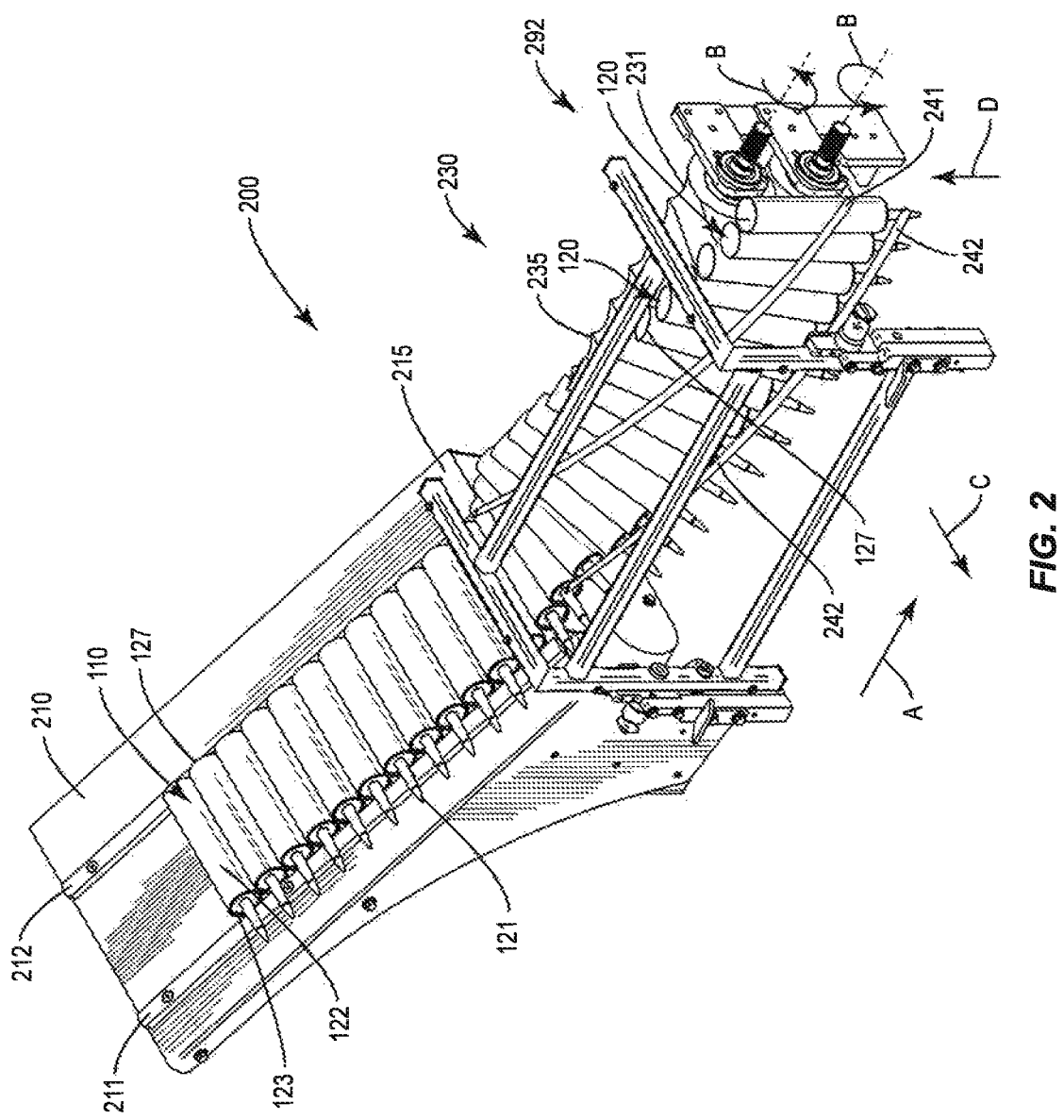
FIG. 2 is a perspective view of the infeed section of the apparatus of FIG. 1.
Figure 3:
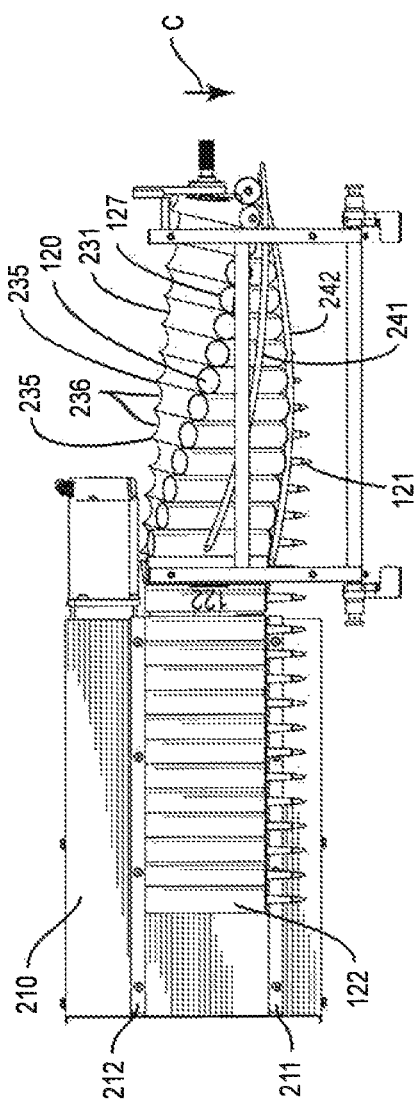
FIG. 3 is a top view of the infeed section of FIG. 2.
Figure 4:
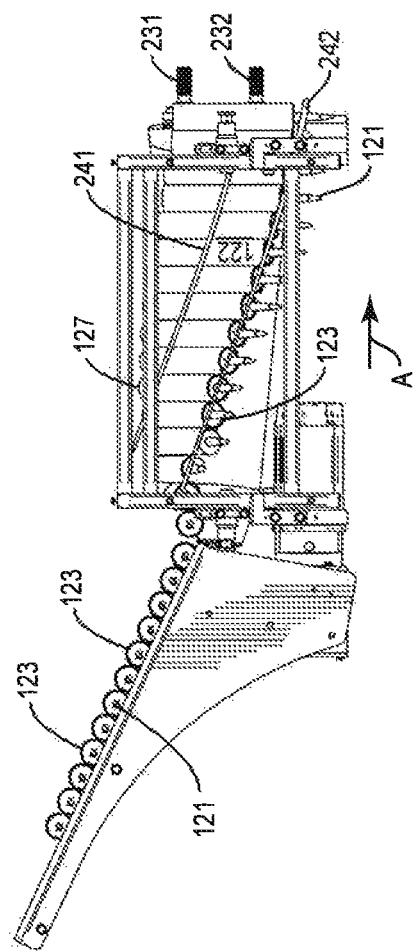
FIG. 4 is a side view of the infeed section of FIG. 2.
Figure 5:
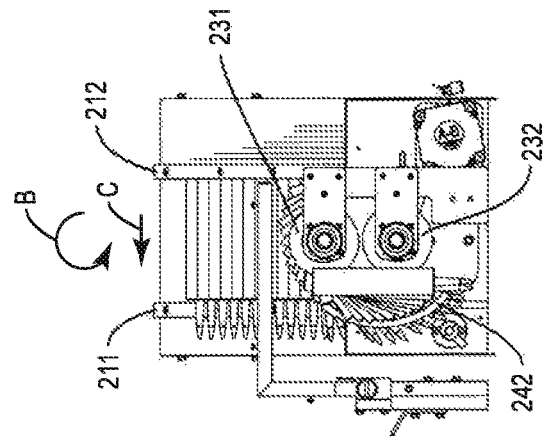
FIG. 5 is an end view of the infeed section of FIG. 2.
Figure 6:
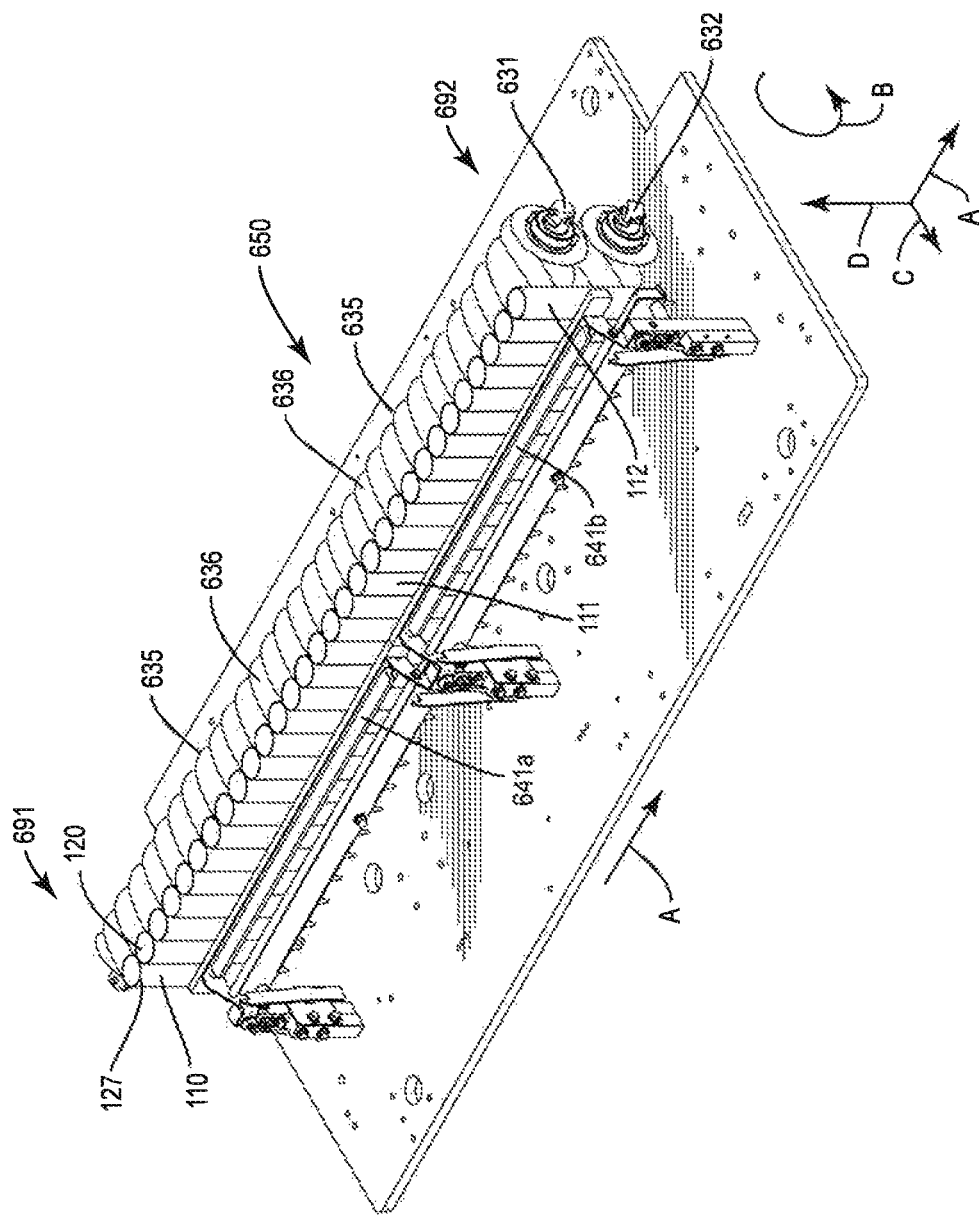
FIG. 6 is a perspective view of a container transportation section of the working section of the filling station of the apparatus of FIG. 1.
Figure 7:
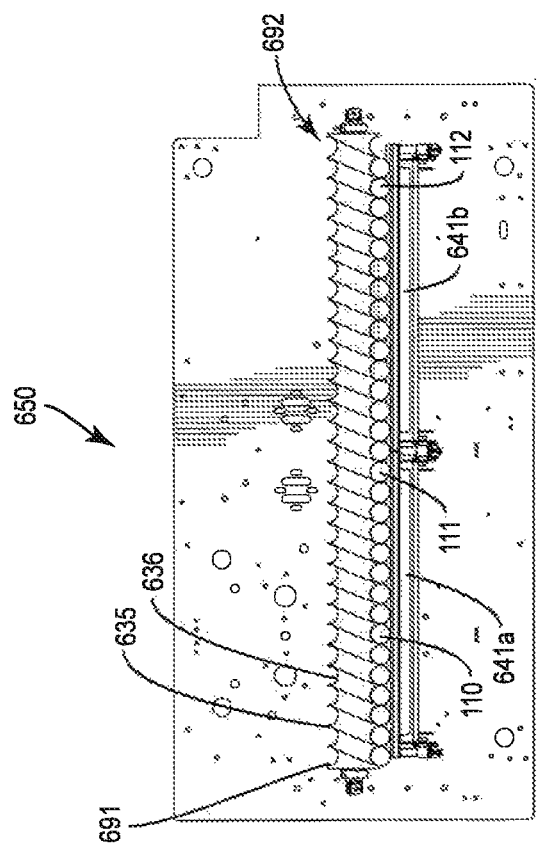
FIG. 7 is a top view of the container transportation section of FIG. 5.
Figure 8:
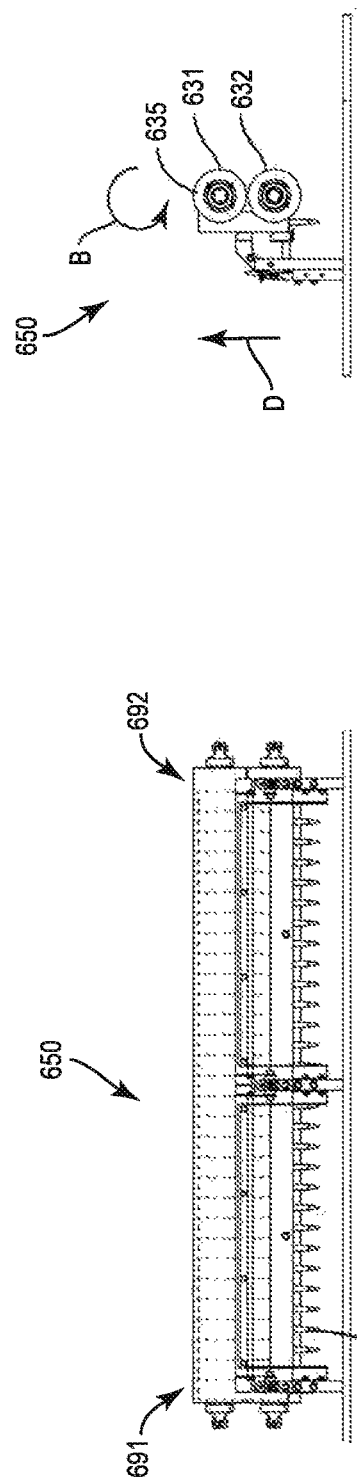
FIG. 8 is a side view of the container transportation section of FIG. 5.
Figure 9:
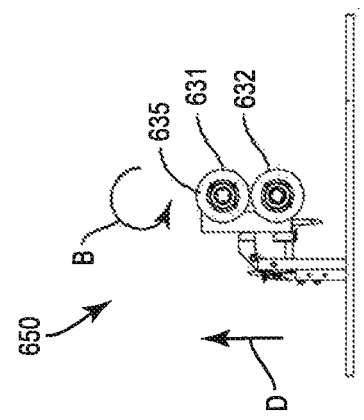
FIG. 9 is an end view of the container transportation section of FIG. 5.
Figure 10:
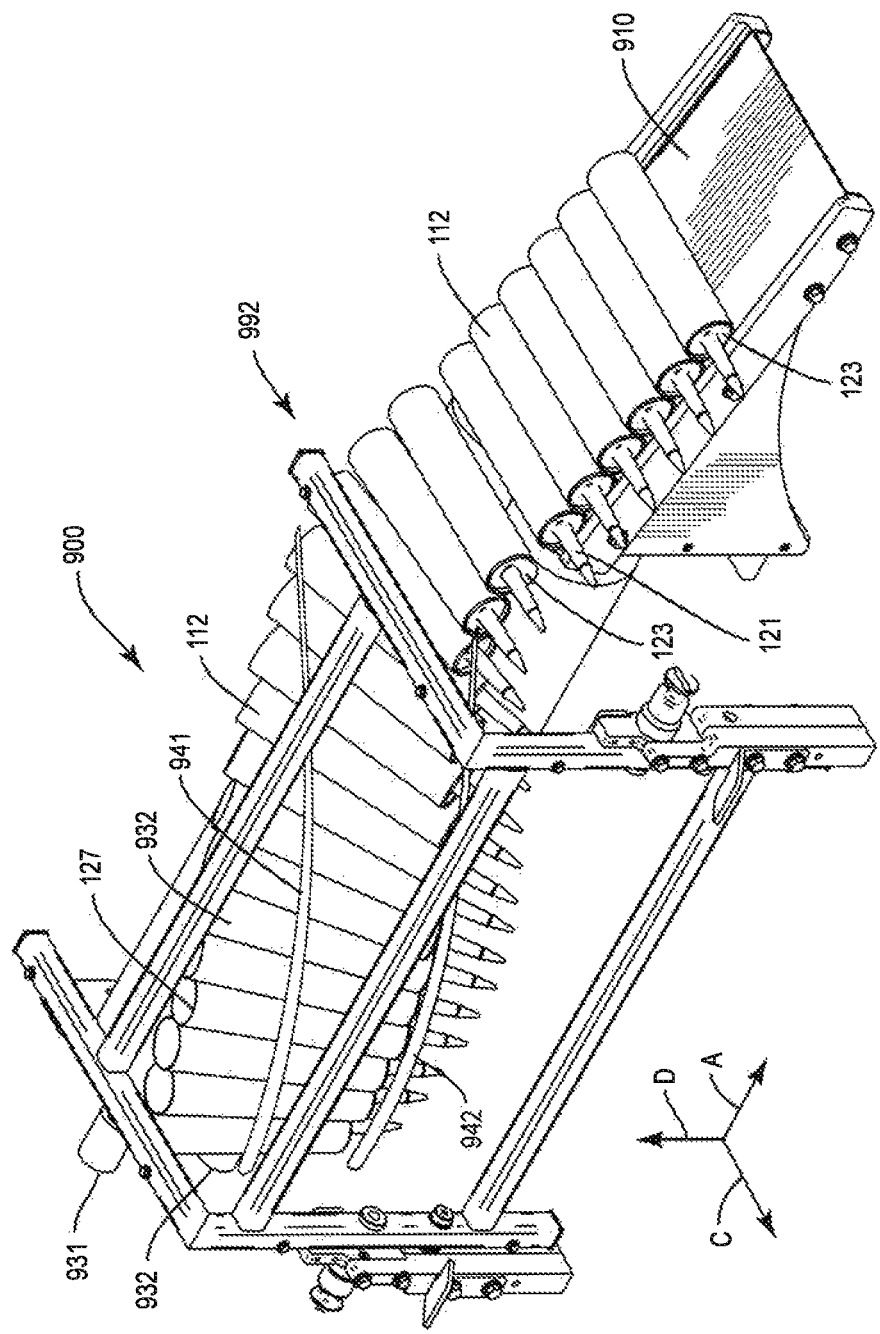
FIG. 10 is a perspective view of the outfeed section of the apparatus of FIG. 1.
Figure 13:
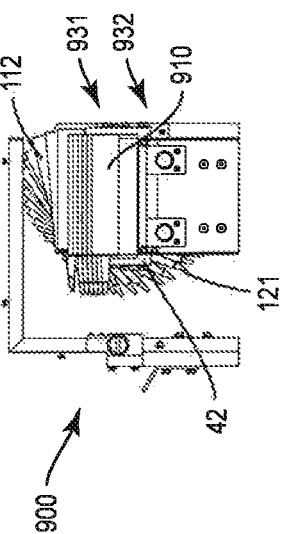
FIG. 13 is an end view of the outfeed section of FIG. 10.
Figure 11:
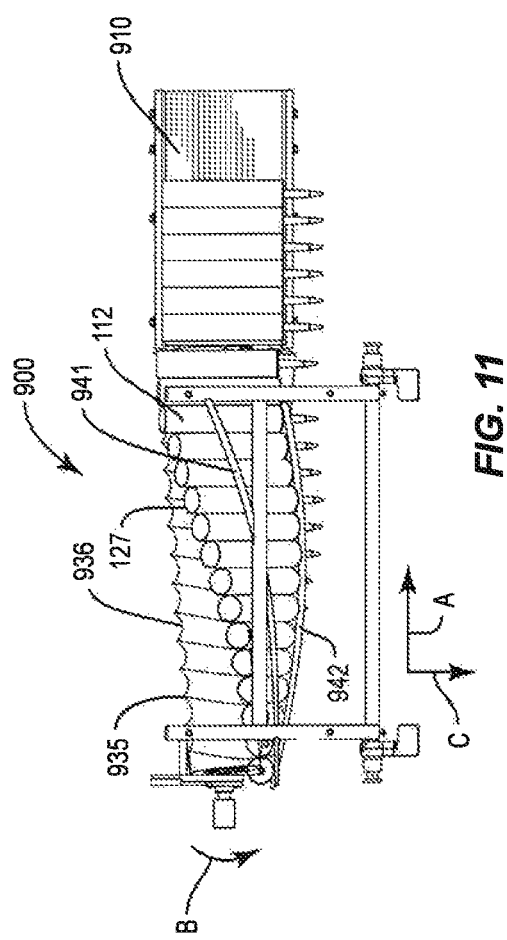
FIG. 11 is a top view of the outfeed section of FIG. 10.
Figure 12:
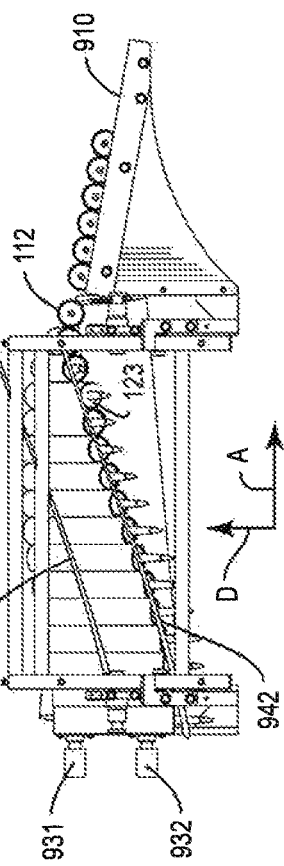
FIG. 12 is a side view of the outfeed section of FIG. 10.

A container filling system preferably delivers the containers in a horizontal orientation in an infeed section; rotates the containers to a vertical orientation for filling in a working section; and can rotate the containers back to a horizontal orientation in an outfeed section. The change from horizontal to vertical (and back), is preferably accomplished with a feed screw conveyor or "a" shaped mechanism, which both advances the containers in a downstream flow direction and provides a surface for them to rotate into and out of the vertical orientation. The screw conveyors can be driven by any known mechanism, such as a belt, gear, chain or other system. The multiple screw conveyors can be linked and driven as a unit or driven separately. In a preferred embodiment of the invention, the screw conveyors are inline and rotate together at the same speed.

A guide bar positioned against the side of the containers holds the containers close to the screw conveyor. A declining guide rail positioned to engage the bottom end of the containers, with the containers resting on the guide rail guides the bottom ends downward and prevents the containers from falling, as they transition from horizontal to vertical. A nozzle extending from the bottom end can help keep the container engaged with the guide rail. The guide rail acts as a camming surface as the bottom end descends into the vertical orientation. A mirror image inclining guide rail can urges the bottom end of the containers upward from the bottom pointing location during the transition from vertical to horizontal. In a preferred embodiment of the invention, dual screw conveyors, one over the other, are used to advance the containers. Using multiple, preferably two screw conveyors is preferred. It can provide a more stable transition between horizontal and vertical orientation and a smaller radius of curvature and therefore shorten the distance needed to curve the containers between the horizontal and vertical orientations.

A container filling system in accordance with the invention can also include a working section. The working section can include machines for filling, capping and sealing the containers. In a preferred embodiment of the invention, the containers are advanced through the working section with single, dual, or multiple screw conveyors. It is preferable that these screw conveyors have the same dimensions as the screw conveyor(s) of the infeed section. It is preferable that the screw conveyors in the working section rotate together with the screw conveyors of the infeed section, to provide smooth downstream flow. They may be linked or driven separately.

The containers can be held against the screw conveyor(s) with a guide bar along their sides and can be supported against falling downward with a guide rail or other support on their bottom end. All the screw conveyors in the system can be linked and driven from the same motor or can be driven by separate motors and/or drives.

A container filling system in accordance with the invention can also include an outfeed section. The outfeed section can be a mirror of the infeed section. Containers are transitioned from a vertical orientation with the bottom end facing downwards, to a horizontal orientation with the bottom end facing horizontally. Preferably, the containers are held against the one or more screw conveyors with a guide bar and urged upward, along the curvature of the screw conveyor(s) with an inclined guide rail, which transitions from below the screw conveyor to alongside the screw conveyor.

Container filling systems in accordance with the invention can include gravity feeds, wherein containers can roll or slide down a ramp into the infeed section. They can also include gravity outputs, where containers can roll or slide from the outfeed section. They can also be urged into the infeed screw conveyor and out of the outfeed screw conveyor by using a powered belt conveyor or drive belts.

A container filling system in accordance with preferred embodiments of the invention is shown generally as an inline: filler 100 in FIG. 1. Inline filler 100 includes an infeed section 200, a working section 600, and an outfeed section 900.

In-line filler 100 is constructed to receive a plurality of unfilled cartridges 110. Unfilled cartridges 110 are elongated and have an open top end 127 and a closed bottom end 123. A container section 120 having a side surface 122 along its length, extends from top 127 to bottom 123. A nozzle portion 121 extends from bottom end 123.

Unfilled cartridges 110 are advanced downstream to working section 600, where material is delivered into container section 120 at a filling station 610 to form a filled cartridge 111. Filling station 610 can comprise any conventional or improved filling station as known in the art. It can include a metered cylinder which received a metered amount of material and a piston for dispensing the material into container section 120. Filled cartridges 111 are then advanced downstream to closing station 620. Closing station 620 can include a plurality of caps or other closures, and install those caps over open top end 127, to enclose the material within container section 120. Closing station 620 can also include crimping devices and/or thermal or sonic welding devices to seal the cap to top end 127, to form a sealed cartridge 112. In-line filler 100 also includes a control panel 150 for adjusting the speed at which cartridges 110, 111, and 112 advance, as well as the filling and capping conditions.

Additional details of infeed section 200 are shown in FIGS. 2-5. Unfilled cartridges 110 are delivered with a horizontal infeed ramp 210. Infeed ramp 210 includes a pair of guide rails 211 and 212, which are spaced slightly wider apart than the length of container portion 120. This helps deliver unfilled cartridges at the proper position.

Infeed section 200 also includes a cartridge transition section 230, including a top infeed screw conveyor 231 and a bottom infeed screw conveyor 232. Screw conveyors 231 and 232 include a helix having a plurality of ridges 235 and concave valleys 236 between ridges 235. Ridges 235 can be the approximate width of container portion 120 and valleys 236 can have the approximate curvature of container portion 120. The tops of the ridges can by pointed or flattened. The depth of the valleys should be about 25% to 50% of the diameter of the containers. The screw conveyors can be formed of a variety of materials, preferably UHMW, Delrin and the like or a coated Aluminum, depending on the application.

A combined cross-sectional height of screw conveyors 231 and 232 (or the cross sectional height if one screw conveyor is used) should be about 66% to 133%, preferably about 90% to about 110% of the length container portion 120.

Infeed ramp 210 includes a bottom ramp end 215. At bottom ramp end 215, cartridges 110 enter transition section 230. There, empty cartridges 110 are held against screw conveyor 231 and/or screw conveyor 232 by a guide bar 241, which acts as a camming surface. Bottom end 123 of cartridges 110 rests against a declining guide rail 242, which is angled downward and guides bottom end 123 downward from its initial orientation pointing horizontally, to a final orientation pointing vertically downward.

As empty cartridges 110 enter transition section 230 and contact top screw conveyor 231, they are urged downstream in forward direction A. Screw conveyors 231 and 232 rotate in the direction of circular arrow B. Based on the helix configuration of ridges 235 and valleys 236, this rotation of screw conveyors 231 and 232 advances cartridges in the downstream direction of an arrow A. This rotation also urges cartridges 110 in the outward direction of an arrow C. However, movement of cartridges 110 in direction C is restrained by the camming function of guide rail 242, which acts as a camming surface against bottom end 123. In addition, side surface 122 of cartridges 110 first contacts top screw conveyor 231 at a location more than half of the distance from bottom end 123, such that the center of gravity is outside screw conveyor 231. Thus, gravity will also urge bottom end 123 of cartridges 110 to rotate downward (rotation of a circular arrow B). In its final orientation, bottom end 123 and nozzle 121 point downward and open end 127 points upward in the direction of an arrow D.

Infeed section 200 has an exit end 292, with empty cartridges 110 in a vertical orientation, with open end 127 pointing upward. After passing exit end 292, empty cartridges 110 enter an entrance end 691 of a container transportation section 650 of working section 600. Container transportation section 650 is shown in FIGS. 6-9. Container transportation section 650 includes an upper transportation screw conveyor 631 above a lower transportation screw conveyor 632.

The screw conveyors described herein are preferably formed as a single piece. It is preferred that transportation screw conveyors 631 and 632 have the same dimensions and rotate at the same speed with infeed screw conveyors 231 and 232 of infeed section 100. They can all be driven by the same actuator and can be linked together or by separate devices.

Transportation screw conveyors 631 and 632 are configured similarly to infeed screw conveyors 231 and 232, with a helix defined by ridges 635 and valleys 636. Transportation screw conveyors 631 and 632 also rotate in the circular direction of arrow B. Screw conveyors 631 and 632 urge empty cartridges 110 in downstream direction A to filling station 610, comprising two filling machines 611 and 612 where they are filled with a selected amount of material and become filled cartridges 111. Optionally, one, two three, or more filling stations are acceptable. Filled cartridges 111 are then urged downstream flow direction A, to two capping and sealing machines 621 and 622 of closing station 620. Filled cartridges 111 are capped and the cap is sealed to container section 120, to create capped and sealed cartridges 112. Optionally, one, three, or more capping and sealing machines are acceptable. A pair of working section guide bars 641a and 641b (FIG. 6) hold cartridges 110, 111 and 112 against transportation screw conveyors 631 and 632 as they proceed through container transportation section 650. Bottom ends 123 slide on a horizontal transportation guide bar (not shown).

At an exit end 692 of container transportation section 650, filled, capped and sealed cartridges 112 are delivered to outfeed section 900, also shown in FIGS. 10-13. Bottom end 123 rests against an inclining guide rail 942 with cartridge 112 in an initially vertical orientation. A pair of outfeed screw conveyors 931 and 932 rotate in the direction of arrow B and urge cartridges 112 in flow, direction A.

Inclined guide rail 942 is inclined in the upward direction of arrow D and acts as a camming surface to lift bottom end 123 and to rotate filled cartridge 112 into a horizontal orientation. Cartridges 112 are held against screw conveyors 931 and 932 by guide bar 941. Thus, as cartridges 112 proceed in downstream flow direction A, they are rotated from the vertical configuration to the horizontal configuration.

In one embodiment of the invention, outfeed screw conveyors 931 and 932 rotate in the same direction as infeed screw conveyors 231 and 232. They can also rotate in the same direction as transportation screw conveyors 631 and 632. Therefore, the rotation of cartridges 112 from a vertical orientation to a horizontal orientation is opposite to and overcomes friction of outfeed screw conveyors 931 and 932, which are urging the cartridges back into the vertical orientation. In another embodiment of the invention, screw conveyors 931 and 932 rotate in the opposite direction of screw conveyors 231 and 232, such that friction urges filled cartridges 112 into the vertical-to-horizontal orientation. In this configuration, the angle of the helix is also opposite, so as to continue to urge cartridges 112 in downstream flow direction A.

Filled, capped and sealed cartridges 112 are delivered to an outfeed exit 992, to an exit ramp 910. Here, gravity feeds cartridges 112 down ramp 910. Depending on their shape, the containers can roll, slide or be transported by a conveyor belt. Thereafter, they can be boxed and shipped.

Container filling systems in accordance with the invention are particularly well suited for dispensing metered amounts of a high viscosity material, such as caulk, adhesive, putty, peanut butter, paint and so forth. For example, materials having a viscosity over 10,000 cp, preferably over 50,000 and even 100,000 cp. On the other hand, it can be used to dispense metered amounts of many different types of material, regardless of viscosity.

Note that in certain preferred embodiments of the invention, the use of a screw conveyor to transport the containers can be used in one, two or all three of the infeed section, container transportation section and outfeed section independently. That is, for example, a screw conveyor can be advantageously used in the container transportation section even if is not used in the infeed or outfeed sections. For example, it can be used as an advantageous device for advancing containers, whether or not it is used to orient or re-orient the containers. Likewise, a screw conveyor can be used in the outfeed section whether or not it had been used in the infeed or transportation sections. Moreover, a screw conveyor can be used in an infeed or outfeed section even if it is not used to orient or re-orient the containers.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A container transportation apparatus, comprising:
a container delivery section constructed and arranged to deliver a plurality of containers having a closed bottom end, and an open top end opposite the bottom end, and a side portion extending from the bottom end to the top end, the container delivery section adapted to deliver the containers in a horizontal orientation with the top end and bottom end intersecting the same horizontal plane;
at least a first rotatable infeed screw conveyor having a first end at the container delivery section and a helix defined by ridges and valleys between the ridges, the infeed screw conveyor positioned horizontally at the height of the container delivery section and extending downstream in a forward direction from the first end at the container delivery section to a second end, the infeed screw conveyor adapted to receive the containers in the valleys and move the containers in the forward direction as the infeed screw conveyor is rotated, from the first end of the infeed screw conveyor to the second end of the infeed screw conveyor;
a second infeed screw conveyor positioned under the first infeed screw conveyor; and
a declining guide rail positioned and adapted to cammingly engage the bottom end of the containers as the containers are moved in the forward direction and to guide the containers from the horizontal orientation to a vertical orientation as the bottom end declines with the guide rail and the top end rotates around the screw conveyor into an upwardly pointing direction.

2. The container transportation apparatus of claim 1, and comprising a guide member positioned and adapted to engage the side portion of the containers and hold the containers against the infeed screw conveyor as the containers are moved in the forward direction.

3. The container transportation apparatus of claim 1, wherein the second infeed screw conveyor has about the same diameter as the first infeed screw conveyor.

4. The container transportation apparatus of claim 3, and including a container transportation section extending from the second end of the first infeed screw conveyor, the container transportation section including at least a rotatable first container transportation screw conveyor, adapted to move the containers in the forward direction.

5. The container transportation apparatus of claim 4, and including at least one container filling and capping device adapted to fill the containers with material and install a cap over the top end.

6. The container transportation apparatus of claim 1, and including a container transportation section extending down stream from the second end of the first infeed screw conveyor, the container transportation section including at least a first rotatable container transportation screw conveyor, adapted to move the containers in a downstream direction.

7. The container transportation apparatus of claim 6, wherein the first container transportation screw conveyor rotates at the same speed, with the first infeed screw conveyor.

8. The container transportation apparatus of claim 6, and including a second container transportation screw conveyor under the first container transportation screw conveyor.

9. The container transportation on apparatus of claim 1, and including at least a rotatable first outfeed screw conveyor positioned to receive the vertically oriented containers, and an inclining guide rail positioned and adapted to camrningly engage an end of the containers and to guide the containers from the vertical orientation to a horizontal orientation as the end inclines with the guide rail and rotates around the outfeed screw conveyor into a horizontally pointing direction.

10. A method for orienting containers between a horizontal and vertical orientation, comprising rotating the containers with the apparatus of claim 1.

11. The method of claim 10, wherein the material has a viscosity over about 50,000 centipoise.

12. A method for orienting containers between a horizontal and a vertical orientation, comprising:
delivering containers in a horizontal orientation, the containers having a bottom end, a top end opposite the bottom end and sides extending from the bottom end to the top end;
engaging the containers with one or more infeed screw conveyors, and moving the containers in a downstream direction of flow as they rotate; and
engaging the bottom end of the containers and rotating the containers around the screw conveyor from the horizontal to a vertical orientation; and
engaging the vertical containers with an outfeed conveyor and guiding the containers from the vertical orientation, to a horizontal orientation with the outfeed conveyor.

13. The method of claim 12, and comprising filling, then capping the containers when they are in the vertical orientation.

14. The method of claim 13, comprising engaging the vertical containers with an outfeed screw conveyor and guiding the containers from the vertical orientation, to a horizontal orientation around the outfeed screw conveyor.

15. The method of claim 14, wherein the infeed screw conveyors and the outfeed screw conveyors rotate at the same speed.

16. The method of claim 13, wherein the material has a viscosity over about 10,000 centipoise.

17. The method of claim 12, wherein the outfeed conveyor comprises a screw conveyor and guiding the containers from the vertical orientation, to a horizontal orientation around the outfeed screw conveyor.

18. The method of claim 12, wherein the containers include a nozzle extending from the bottom end.

19. A container orientation and transportation apparatus, comprising:
a container receiving section constructed and arranged to receive a plurality of horizontally oriented containers having a closed bottom, an open top and a side;
at least a first rotatable infeed screw conveyor having a first end at the container receiving section, a second end opposite the first end and a helix from the first end to the second end;
a guide positioned and adapted to cammingly engage the containers and guide the containers against and around the at least one rotatable infeed screw conveyor from the horizontal orientation to a vertical orientation; and
an outfeed conveyor having a first end at the second end of the container transportation screw conveyor and a second end opposite the first end and a guide postioned and adapted to cammingly engage teh containers and guide the containers from the vertical orientation to a horizontal orientation as they travel from the first end to the second end of the outfeed converyor.

20. The container orientation and transportation apparatus of claim 19, and including at least a first rotatable container isportation screw conveyor having a first end at the second end of the infeed screw conveyor and a second end opposite the first end and a helix from the first end to the second end.

21. The container orientation and transportation apparatus of claim 20, wherein the outfeed conveyor includes a rotatable outfeed screw conveyor having a first end at the second end of the container transportation screw conveyor and a second end opposite the first end and a helix from the first end to the second end and a guide positioned and adapted to cammingly engage the containers and guide the containers against and around the at least one rotatable outfeed screw conveyor from the vertical orientation to a horizontal orientation.

22. The container orientation and transportation apparatus of claim 21, wherein the infeed screw conveyor, the container transportation screw conveyor and the outfeed screw conveyor are all linked together and powered from the same drive source.

\* \* \* \* \*